No. 748,651. PATENTED JAN. 5, 1904.
A. H. REIMANN.
TWIST DRILL GRINDER.
APPLICATION FILED DEC. 15, 1902.
NO MODEL. 2 SHEETS—SHEET 1.

WITNESSES.
O. B. Banziger
M. H. Strube

INVENTOR.
Adolph H. Reimann
By Newell S. Wright
His Attorney

No. 748,651. PATENTED JAN. 5, 1904.
A. H. REIMANN.
TWIST DRILL GRINDER.
APPLICATION FILED DEC. 15, 1902.
NO MODEL. 2 SHEETS—SHEET 2.

WITNESSES. INVENTOR.
Adolph H. Reimann
By Newell S. Wright
His Attorney

No. 748,651. Patented January 5, 1904.

UNITED STATES PATENT OFFICE.

ADOLPH H. REIMANN, OF DETROIT, MICHIGAN.

TWIST-DRILL GRINDER.

SPECIFICATION forming part of Letters Patent No. 748,651, dated January 5, 1904.

Application filed December 15, 1902. Serial No. 135,178. (No model.)

*To all whom it may concern:*

Be it known that I, ADOLPH H. REIMANN, a citizen of the United States, residing at Detroit, county of Wayne, State of Michigan, have invented a certain new and useful Improvement in Twist-Drill Grinders, of which the following is a specification, reference being had to the accompanying drawings, which form a part of this specification.

My invention has for its object a novel twist-drill grinder; and it consists of the construction, combination, and arrangement of devices hereinafter described and claimed, and illustrated in the accompanying drawings, in which—

Figure 1:
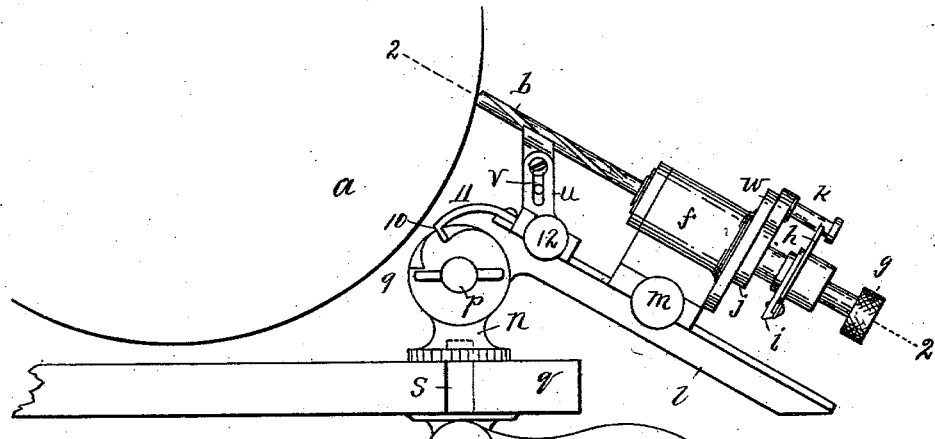
Figure 2:
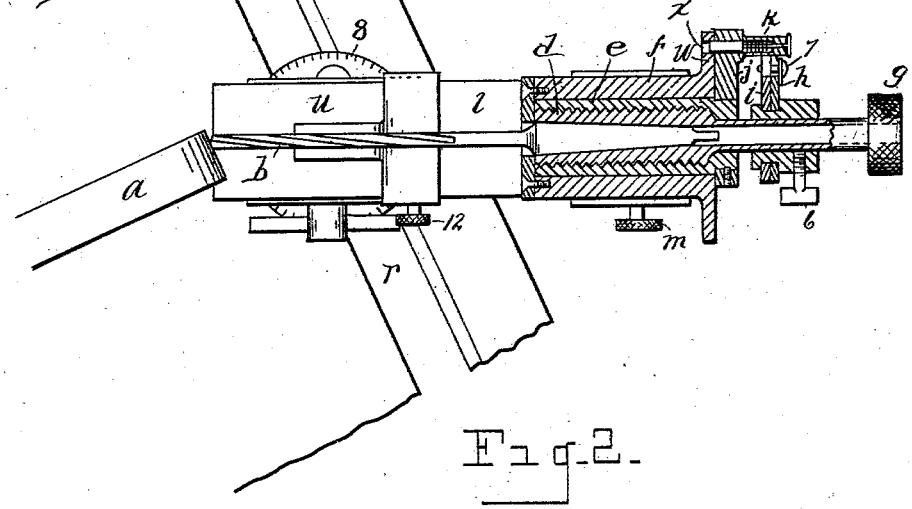
Figures 3, 4, 5:
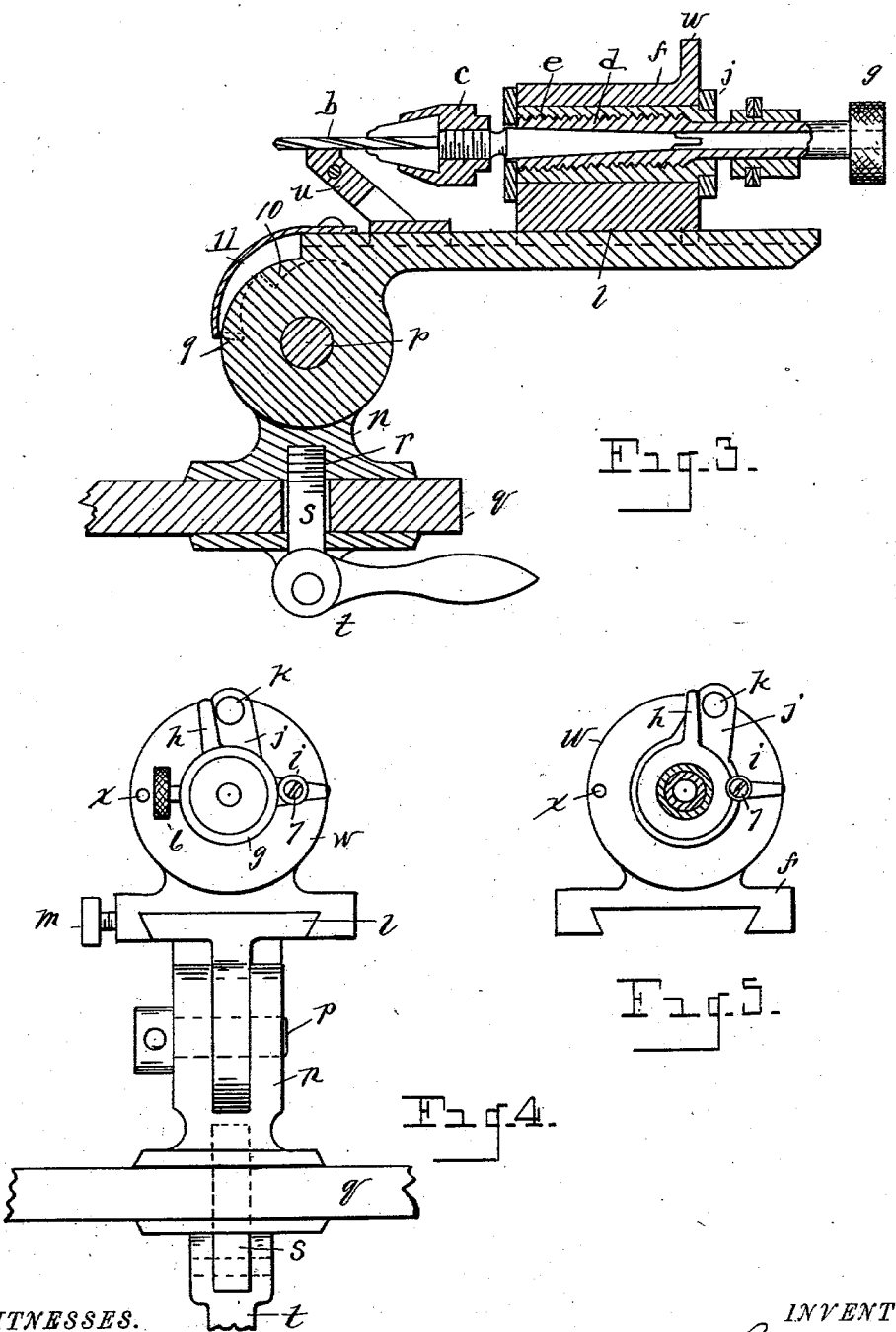

Figure 1 is a view in side elevation, illustrating features of my invention. Fig. 2 is a view in horizontal section on the line 2 2, Fig. 1. Fig. 3 is a view in vertical longitudinal section. Fig. 4 is a rear end elevation. Fig. 5 is a view in section on the line 5 5, Fig. 3.

The object of my invention is to provide a new and useful twist-drill grinder whereby the drill may be so ground as to have the right clearance, whereby one side of the drill may be ground and then turned over to grind the other side, and whereby also the drill may be ground between the ground surfaces or sides—*i. e.*, central or on opposite sides of the center of the point of the drill.

The purpose of my invention is particularly to secure accuracy in the grinding of the drill and to effect the same in a simple and convenient manner.

I carry out my invention as follows:

In the drawings any suitable grinding-wheel is indicated at $a$, and $b$ represents a drill to be ground. Said drill may be engaged in any suitable chuck $c$, if desired, the chuck being engaged in any suitable chuck or tool holder $d$, provided with a rearwardly-extending stem. With certain forms of drills, however, the chuck may be dispensed with and the rear end of the drill may be directly engaged in the holder $d$—as indicated, for example, in Fig. 2—Fig. 3 showing a chuck engaging the drill, the chuck being engaged in the holder. Whether or not a chuck is to be employed depends simply upon the construction of the drill. The chuck may be dispensed with without departing from the principles of my invention. The holder $d$ has a threaded engagement, as shown, in a sleeve or reversing-block $e$, the sleeve being engaged in a housing $f$. The holder $d$ is preferably provided with a milled head, (indicated at $g$,) whereby the holder may be rotated within the reversing-block. Upon the holder are also engaged spacing fingers or stops, (indicated at $h$ and $i$.) The sleeve is practically a reverse-block, the same being provided with a reverse-lever $j$, having a rearwardly-projecting arm or pin $k$, against which the spacing-fingers $h$ and $i$ may contact to limit the rotation of the holder $d$. The block $f$ is supported upon a bed or plate $l$ and is longitudinally movable thereupon, so that the holder $d$ may receive longer or shorter drills. The housing $f$ may have a dovetail engagement upon the bed $l$, as shown, or be otherwise engaged upon said bed and may be held in any adjustable position by means of a set-screw $m$. The plate or bed $l$ has a joint engagement upon a standard $n$, as indicated at $p$, said standard being engaged upon any suitable support or table $q$, the said standard preferably having a laterally-adjustable engagement upon said table. To this end the said table may be constructed with an elongated slot (indicated at $r$) to receive a spindle $s$, engaged with the standard, a cam-lever $t$ being provided to bind the standard upon the table. By means of a jointed engagement of the bed $l$ with a standard $n$ it is apparent that said bed, with the mechanism supported thereupon, may have a vertical oscillatory movement. Supported upon the plate $l$ is a guide-arm $u$, upon which the drill may rest toward its outer end. To accommodate smaller or larger drills, the guide-arm may be made vertically adjustable in any suitable manner—as indicated, for example, at $v$. The housing $f$ is formed with an outwardly-projecting flange $w$ at its rear end. The arm or pin $k$ is preferably a spring-pin, its end being engageable in an orifice $x$ in the flange $w$ to hold the lever $j$ in any given location. The spacing-fingers $h$ and $i$ are preferably made adjustable upon the holder $d$, as by means of set-screws, (indicated by the numerals 6 and 7,) said spacing-fingers being preferably provided with disks, whereby the fingers are mounted upon the rearwardly-extended stem of the tool or chuck holder *d*. As shown, however, the finger *i* may have an adjustable engagement upon the finger *h*. By loosening the cam-lever *t* it is evident that the standard *n* may also have a lateral oscillation upon the standard *s*. The lateral adjustment of the standard upon the table *q* enables me to use the whole surface of the grinding-wheel.

The operation of the device will now be understood. The tool or chuck holder *d* may be moved into position by turning the milled head *g* to grind first one side of the drill, after which the tool-holder may be reversed to grind the other side of the tool, while, also the device may readily be oscillated, so as to grind the intermediate sides of the drill when required.

Obviously it is important to have the right clearance in grinding the opposite sides of the drill, which is accomplished by the threaded engagement of the tool-holder *d* in the sleeve *e*, this threaded engagement being in the nature of a feed-screw, whereby the holder may be advanced and turned at the same time, thereby giving the required clearance as the drill is ground. By the oscillation of the bed *l* the central point of the drill may be alternately ground. By means of the spacing fingers or stops *h* and *i* striking against the arm *k* as the tool-holder is turned in reverse directions the two sides of the drill are ground correctly, the spacing-fingers being properly adjusted. The standard *n* is preferably formed with graduations, as indicated at 8, whereby the required angle may be correctly given to the drill in grinding.

To insure the proper grinding of the center of the drill between the sides, the end of standard *n* is preferably made disk-shaped and is provided with notches, (indicated by the numerals 9 and 10,) a spring 11 being provided to engage in said notches, as required. The guide-arm *u* may also be longitudinally adjusted upon the bed *l* and may be provided with a set-screw 12, whereby it may be set in any given position of adjustment. It will be understood that when a drill is provided with a tapering shank the chuck need not be employed.

What I claim as my invention is—

1. In a twist-drill grinder the combination of a tool-holder provided with a rearwardly-projecting stem, a reversing-block or sleeve about the tool-holder and having a threaded engagement with said holder whereby the tool-holder may be rotated within the reversing-block, a housing about said block or sleeve, a plate or bed to support the housing, a standard upon which said plate or bed has a jointed engagement toward the forward end of the plate or bed, a support for said standard, the stem of the tool-holder provided with a stop to limit the rotation of the holder, and means to limit the movement of said stop.

2. In a twist-drill grinder the combination of a tool-holder provided with a rearwardly-projecting stem, a reversing-block or sleeve within which said holder has a threaded engagement whereby the tool-holder may be rotated within the reversing-block, a housing about said block or sleeve, a plate or bed to support said housing, a standard upon which said plate or bed has a jointed engagement toward the forward end of the plate or bed, a support for said standard, said housing being adjustable upon said support toward and from the work, the stem of the tool-holder provided with spacing fingers or stops, and means connected with the reversing-block or sleeve to limit the movement of said stops.

3. In a twist-drill grinder the combination of a tool-holder provided with a rearwardly-extended stem and with means for rotating the holder, a reversing-block or sleeve within which the holder has a threaded engagement whereby the tool-holder may be rotated within the reversing-block, a housing within which said block or sleeve is located, a plate or bed to support said housing, a standard upon which said plate or bed has a jointed engagement toward the forward end of the plate or bed, a support for said standard, and spacing mechanism to limit the movement of the tool-holder.

4. In a twist-drill grinder the combination of a rotatable tool-holder, a reversing-block or sleeve within which said holder has a threaded engagement, a housing within which said block or sleeve is located, a support for said housing, spacing fingers or stops upon said holder, a rearwardly-projecting lever-arm upon said block or sleeve, a rearwardly-projecting spring-pin engaged with said block or sleeve and arranged to engage the housing, said spacing fingers or stops arranged to strike against the rearwardly-projecting spring-pin.

5. In a twist-drill grinder the combination of a rotatable tool-holder provided with a rearwardly-projecting stem, a reversing-block or sleeve within which the tool-holder may be advanced and retracted whereby the tool-holder may be rotated within the reversing-block, a housing in which said block or sleeve is rotatable, a plate or bed to support said housing, a standard upon which said plate or bed has a jointed engagement toward the forward end of the plate or bed, a support for said standard, means to limit the rotation of the block or sleeve, and means to limit the advancement of the tool-holder.

6. In a twist-drill grinder the combination of a rotatable tool-holder, a reversing-block or sleeve within which the holder may be advanced and retracted, a housing within which said block or sleeve is rotatable, a support for said housing, means to limit the rotation of the block or sleeve, and means to limit the advancement of the tool-holder, said support being vertically oscillatory, and said housing having an adjustable engagement upon said support toward and from the work.

7. In a twist-drill grinder the combination of a tool-holder, a reversing-block or sleeve in which the holder may be advanced and retracted, a housing in which said block or sleeve is rotatable, a support for said housing, means to limit the rotation of the block or sleeve, and means to limit the advancement of the tool-holder, said support being laterally oscillatory.

8. In a twist-drill grinder the combination of a tool-holder, a reversing-block or sleeve within which the holder may be advanced and retracted, a housing within which said block or sleeve is rotatable, a support for said housing, means to limit the rotation of the block or sleeve, and means to limit the advancement of the tool-holder, a standard upon which said support has a jointed engagement, said support being vertically and laterally oscillatory, said standard being laterally adjustable upon said bed or table.

9. In a twist-drill grinder the combination of a rotatable tool-holder, a reversing-block or sleeve within which the holder may be advanced and retracted, a housing within which said block or sleeve is rotatable, a support for said housing, means to limit the rotation of the block or sleeve, and means to limit the advancement of the tool-holder, and a guide for a drill engaged upon said support, said guide adjustable vertically and longitudinally of the holder.

10. In a twist-drill grinder the combination of a tool-holder, a reversing-block or sleeve within which the holder may be advanced and retracted, a housing within which said block or sleeve is rotatable, a support for said housing, means to limit the rotation of the block or sleeve, means to limit the advancement of the tool-holder, and a guide for the drill having an adjustable engagement upon said support longitudinally of the holder.

11. In a twist-drill grinder the combination of a tool-holder, a reversing-block or sleeve in which the holder may be advanced and retracted, a housing in which said block or sleeve is rotatable, a support for said housing, means to limit the rotation of the block or sleeve, and means to limit the advancement of the tool-holder, a standard with which said support has a jointed engagement, and a spring-arm carried by said support to engage said standard.

In testimony whereof I have signed this specification in the presence of two subscribing witnesses.

ADOLPH H. REIMANN.

Witnesses:
N. S. WRIGHT,
M. M. STRUBLE.